UNITED STATES PATENT OFFICE.

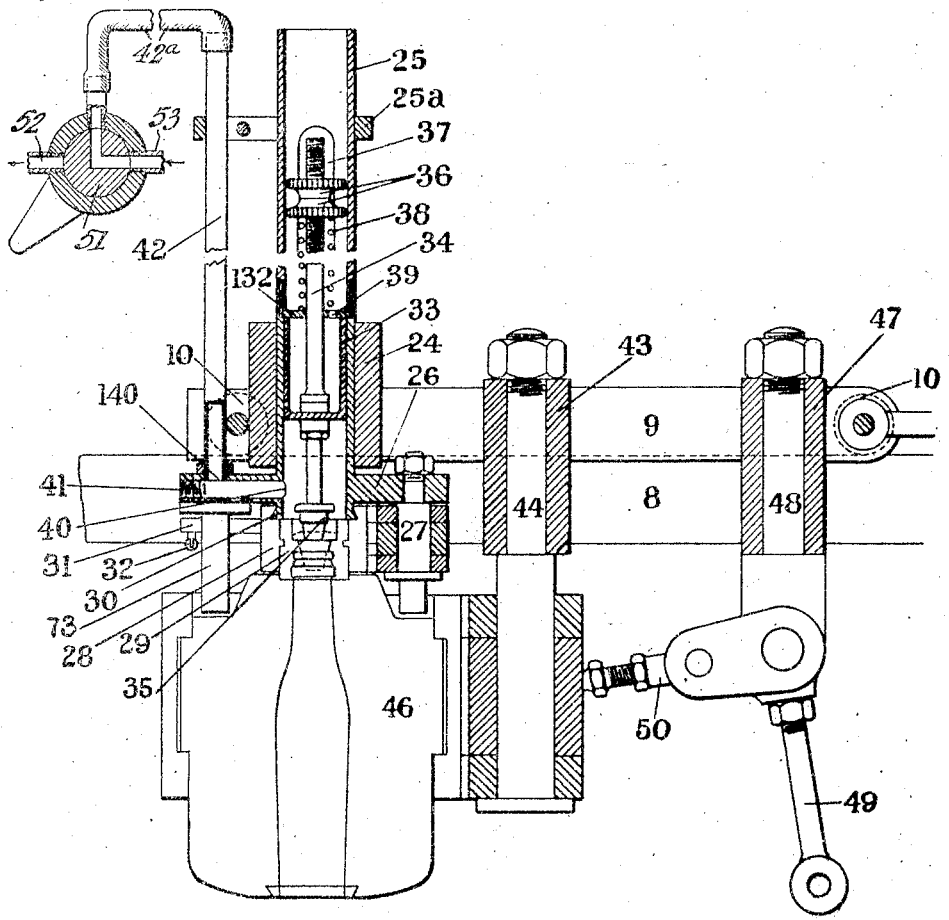
A. WILZIN.
GLASS SHAPING OR BLOWING MACHINE.
APPLICATION FILED MAR. 3, 1917.
1,338,604.
Patented Apr. 27, 1920.
INVENTOR
Arthur Wilzin
her John E. Haworth
Attorney

ARTHUR WILZIN, OF ST. OUEN, FRANCE.

GLASS SHAPING OR BLOWING MACHINE.

1,338,604.  Specification of Letters Patent.  Patented Apr. 27, 1920.

Application filed March 3, 1917. Serial No. 152,344.

*To all whom it may concern:*

Be it known that I, ARTHUR WILZIN, a citizen of the United States of America, and resident of St. Ouen, Seine, France, have invented new and useful Improvements in or in Connection with Glass Shaping or Blowing Machines, of which the following is a specification.

This invention relates to a suction head for glass blowing and molding machines of the type in which the mold is filled with molten glass by means of suction, and has to do more especially with the suction heads of machines, in which the plunger that coöperates with the neck mold and forms a depression in the glass for a purpose well understood, is capable of longitudinal movement so that the same may be shifted out of its molding position in order to form a passageway of large cross sectional area through the neck mold during the earlier, and, preferably, the greater portion of the suction or filling operation.

It is the object of this invention to provide an improved and simplified suction head, in which the plunger is normally held out of its molding position, and is then automatically moved into such position at the proper stage of the mold filling operation.

In order that the invention may be more clearly understood, reference will be made to the accompanying drawing which shows in sectional elevation, a form of suction head in accordance with the present invention.

In the accompanying drawing, 9 represents a carriage provided with wheels 10 running on a set of rails 8, and carrying a guide block 24. This guide block, which may be an integral portion of the carriage 9, supports a tubular member 25 which is free to move in a vertical direction in said guide block and is provided at its lower end with a flange 26.

The tubular member 25 is divided into an upper and lower portion by a horizontal diaphragm 132, and located movably in the lower portion of said member is a tubular piston 33 mounted upon a rod which carries at its lower end the plunger 35 which coöperates with the neck mold to form the mouth of the bottle. The upper portion of this rod, which is above the diaphragm 132, is screw-threaded, and has a pair of adjusting nuts 36 mounted thereon, the purpose of these nuts being to adjust the tension of a spring 38 which bears between the diaphragm 132 and the adjusting nuts 36. The tubular member 25 is slotted longitudinally as shown at 37 in order to permit turning of the adjusting nuts 36, and the tension of the spring 38 is so adjusted that the rod 34 and plunger 35 are normally held in the position indicated in full lines in the drawing, the hole 39 in the diaphragm 132 placing the space between the piston 33 and said diaphragm in communication with the atmosphere.

A passageway 40 is formed in the flange 26, communicating at its inner end with the interior of the lower portion of the tubular member 25, and having its outer end normally closed by a pipe plug 41. Connected to this passageway by an opening 140 is a pipe 42, braced at its upper end by a collar 25$^a$ which pipe together with the flexible tube 42$^a$ serves the function of placing the space in the tubular member 25, below the piston, in communication with a two way valve 51, this valve being connected with two sources of air by means of pipes 52 and 53, one of these being under pressure and the other being below atmospheric pressure. By means of this valve, the space below the tubular piston 33 may either be exhausted for the filling operation, or placed under pressure for the blowing operation. Flange 26 carries a pin 27, upon which the two halves of a neck mold 28 are hinged, said neck mold normally being held closed by a spring 32 which is stretched between two projections 31 fastened respectively to the two halves of the neck mold. A circular sub-flange 30 projects from the flange 26, this sub-flange being of a conical shape and fitting correspondingly shaped semi-circular depressions in the two halves of the neck mold, thereby accurately centering the same with respect to the tubular member 25 when the neck mold is closed.

Carriage 9 also carries transverse members 43 and 47 both of which project downwardly between the rails 8 and both of which are similarly drilled to receive pins 44 and 48. Pin 44 furnishes a bearing for the two hinged parts of a parison mold 46, while the pin 48 furnishes a support for the linkage 50 and operating member 49 for opening and closing the parison mold. Since neck mold 29 is supported by flange 26 which is freely movable along with the tubular member 25, it follows that the neck mold seats upon the parison mold, forming a tight joint therewith by means of its own weight together with the weight of the associated parts, the upper surface of the parison mold and the under surface of the neck mold being specifically prepared for this function.

When the parison mold 46 is to be filled, a supply of molten glass in a gathering ladle is applied to the bottom of the mold, the operator at the same time manipulating the two way valve so as to apply suction to the space in the tubular member 25 below the piston 33, and thereby causing the molten glass to enter the parison mold.

During the earlier, and, preferably, the greater part of this filling operation, the spring 38 holds the neck forming plunger 35 in the full line position, thereby permitting the parison mold to rapidly fill, due to the rapid exhaustion of the parison mold through the large cross sectional opening in the neck mold. Owing to the tenacious quality of the molten glass, however, when the mold becomes nearly full, the suction increases to such an extent that the tension of the spring 38 is overcome and the plunger 35 is forced into the dotted line position by atmospheric pressure acting on the upper side of the piston 33 through the orifice 39, thereby forming the mouth of the bottle, and a blowing recess in the glass. The suction is then shut off by the two way valve and the parison mold is removed. The parison now depending from the neck mold is placed in a finishing mold. Compressed air for blowing the bottle is then admitted to the pipes 42, 40 by means of the two way valve, whereupon plunger 35 is lifted to its upper position by the action of the air on the lower side of piston 33, if spring 38 has not already lifted it upon the cutting off of the suction.

The tension of spring 38 is so regulated that the plunger 35 will not operate too soon in the filling operation.

The large cross sectional exhaust present in the neck mold during the filling operation, besides enabling the parison mold to be quickly filled, also diminishes the harmful effect of any leakage which may take place between the parison and neck molds.

The suction head forming the subject of the present invention is disclosed in my copending U. S. application Serial No. 152,343, filed March 3, 1917, but is not therein claimed.

What I claim is:—

1. In a suction head for glass blowing and molding machines, the combination with a neck mold, of a movable plunger adapted to coöperate therewith, a spring adapted to normally hold said plunger out of coöperative relation with said neck mold, a parison mold also adapted to coöperate with said neck mold, a pneumatic piston for moving said plunger into coöperative relation with said neck mold, said piston being actuated against the tension of said spring by the suction existing in the parison mold only during the latter part of the filling thereof, and means for adjusting the tension of said spring to determine the stage in the filling operation at which the plunger is moved into coöperative relation with said neck mold.

2. In a suction head for glass blowing and molding machines, the combination with a parison mold adapted to be filled by suction, of a neck mold, a movable plunger actuated by the suction in the parison mold during the filling thereof and adapted to be moved thereby into operative relationship with said neck mold only during the latter part of the filling thereof, means adapted to normally resist the suction in the parison mold and to hold said plunger out of coöperative relationship with said neck mold, and means for varying the resistivity of said plunger to the degree of suction existing in the parison mold.

Dated this 29th day of January, 1917.

ARTHUR WILZIN.